Patented Nov. 21, 1933

1,936,276

UNITED STATES PATENT OFFICE 1,936,276

METALLIFEROUS AZO-DYESTUFFS AND PROCESS OF MAKING SAME

Fritz Straub, Basel, and Walter Hanhart, Riehen, near Basel, Switzerland, assignors to the firm of Society of Chemical Industry in Basle, Basel, Switzerland No Drawing. Application February 13, 1933, Serial No. 656,619, and in Switzerland February 18, 1932

18 Claims. (Cl. 260—12)

The present invention relates to new metalliferous azo-dyestuffs. It comprises the process of making these dyestuffs, the dyestuffs themselves and the material dyed with the new products.

According to this invention new valuable metalliferous dyestuffs are obtained by treating with agents yielding metals capable of forming lakes with the lake-forming groups of the dyestuffs, azo-dyestuffs of the general formula

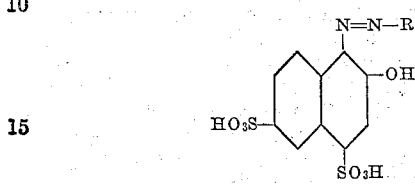

in which R represents the radicle of a coupling component.

Such agents are, for example, compounds of chromium, copper iron, cobalt, nickel, manganese, zinc, vanadium and titanium.

As coupling components there may be used all those which come into consideration for the production of azo-dyestuffs, such as for example arylamines, phenols, napthols, as well as their substitution products which may contain for example halogens, sulfonic groups alkyl-, nitro-, or alkoxy-groups, as also compounds of which the carbon atom capable of coupling belongs to a heterocyclic ring or to an open chain. The former is for example the case with pyrazolones, hydroxyquinolines and barbituric acids, as well as with their substitution products which may contain for example halogens, sulfonic groups, alkyl-, nitro-, or alkoxy-groups, the latter for instance with the acetoacetic acid derivatives and the benzoylaceto-o-carboxylic acids.

By the invention metalliferous dyestuffs are obtained which contain only one metal or several metals. In making those which have more than one metal the several agents yielding metals may act either in succession or together.

The treatment with the agent yielding metal may occur in acid, neutral or alkaline medium, with or without suitable additions such as for example common salt, Glauber's salt, sodium acetate, alkali phosphate, acids, such as for instance acetic acid, formic acid or oxalic acid, and under normal or increased pressure; also in the course of the manufacture of the dyestuff or in the dye-bath.

The complex metal compounds made according to the invention may be used for dyeing materials of any kind, such as wool, silk, cotton, leather, artificial silk derived from regenerated cellulose, cellulose esters and ethers, lacquers made from a cellulose basis and a natural or artificial resin basis; or as pigments or in printing. The colors are of various tints and the dyeings are very fast.

The following examples illustrate the invention, the parts being by weight:—

Example 1

49.6 parts of the dyestuff obtained by coupling diazotized 1-amino-2-hydroxynaphthalene-4:6-disulfonic acid with β-naphthol of the formula

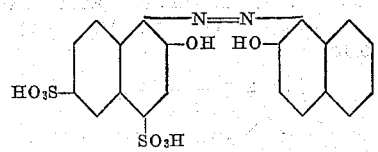

are dissolved in 400 parts of water and, after addition of a solution of 5 per cent. strength of chromium fluoride corresponding with 7.6 parts of $Cr_2O_3$, the whole is boiled for 3 hours in a reflux apparatus. Any excess of chromium is then precipitated by addition of some sodium carbonate, the precipitate is filtered and the filtrate is evaporated. In this manner there is obtained a dark powder which dissolves in concentrated sulfuric acid to a blue-violet solution and in water to a violet solution. The dyestuff dyes wool in an acid bath fast blue tints.

Example 2

54.8 parts of the mono-sodium salt of the dyestuff from diazotized 1-amino-2-hydroxynaphthalene-4:6-disulfonic acid and 1-phenyl-3-methyl-5-pyrazolone of the formula

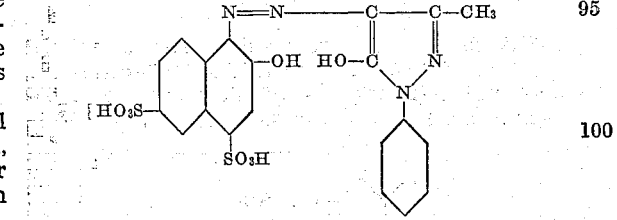

are dissolved in 1000 parts of water and after addition of a solution of 5 per cent. strength of chromium fluoride corresponding with 7.6 parts of $Cr_2O_3$ the whole is boiled for about 3 hours in a reflux apparatus. The chromium compound is then salted out; when dry it is a dark red powder which dissolves in concentrated sulfuric acid to an orange-yellow solution and in water to a bluish-red solution. The dyestuff dyes wool in an acid bath fast rose tints.

Example 3

52.4 parts of the sodium salt of the dyestuff from diazotized 1-amino-2-hydroxynaphthalene-4:6-disulfonic acid and barbituric acid of the formula

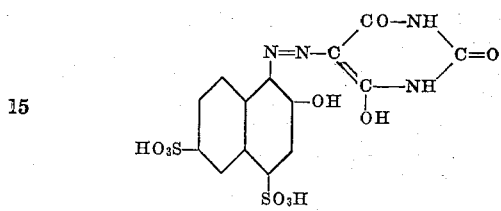

are dissolved in 800 parts of water and after addition of a solution of 10 per cent. strength of chromium sulfate, corresponding with 7.6 parts of $Cr_2O_3$, the whole is boiled for about 3 hours in a reflux apparatus. On cooling, the greater part of the dyestuff crystallizes; it is filtered and dried. It is a light brown powder, soluble in concentrated sulfuric acid to a red-orange solution and in water to a red solution; it dyes wool in an acid bath very pure, fast red tints.

Example 4

62.8 parts of the monosodium salt of the dyestuff from diazotized 1-amino-2-hydroxynaphthalene-4:6-disulphonic acid and 1-(phenyl-3'-sulfamide)-3-methyl-5-pyrazolone of the formula

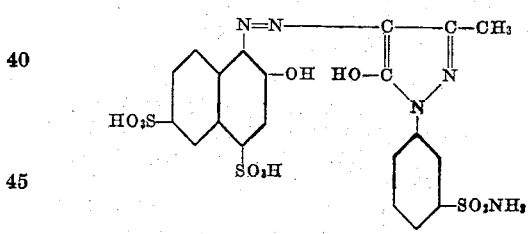

are dissolved in 500 parts of water and after addition of a solution of 10 per cent. strength of chromium sulfate corresponding with 7.6 parts of $Cr_2O_3$, the whole is boiled for 2 hours in a reflux apparatus. On cooling, a part of the dyestuff separates in crystalline form. It is filtered and dried, when it becomes a light brown powder which dissolves in concentrated sulfuric acid to an orange yellow solution and in water to a red solution. The dyestuff dyes wool in an acid bath fast pure rose tints.

Example 5

62.9 parts of the azo-dyestuff from diazotized 1-amino-2-hydroxynaphthalene-4;6-disulfonic acid and 1-(phenyl-3'-sulfonic acid)-3-methyl-5-pyrazolone of the formula

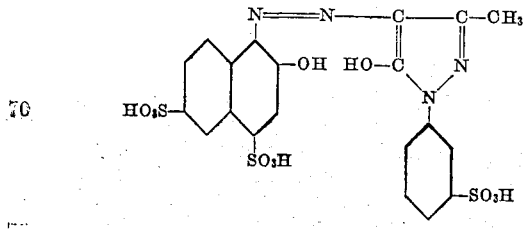

are dissolved in 250 parts of water and, after addition of 7.6 parts of $Cr_2O_3$, in the form of a chromium fluoride solution, the whole is boiled for 3 hours in a reflux apparatus. On cooling, the dyestuff separates in greater part in a crystalline form. After filtration and drying, it is a dark red powder, soluble in water to a red solution and in strong sulfuric acid to a yellow solution. It dyes wool in an acid bath pure rose tints very fast to light.

Example 6

70 parts of the azo-dyestuff from diazotized 1-amino-2-hydroxynaphthalene-4:6-disulfonic acid and 1-hydroxynaphthalene-4:8-disulfonic acid of the formula

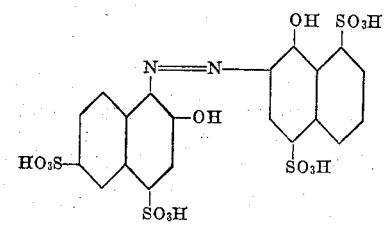

are dissolved in 600 parts of hot water and, after the addition of a solution of chromium fluoride corresponding with 15.2 parts of $Cr_2O_3$, the whole is boiled for some hours in a reflux apparatus. Any excess of chromium which may be present is precipitated by addition of some sodium carbonate, the solution is filtered and evaporated on the water-bath. There is thus obtained a dark powder of bronze lustre, which dissolves in water and in concentrated sulfuric acid to a blue-violet solution. The dyestuff dyes wool in a bath containing sulfuric acid pure blue tints fast to light.

Example 7

52.8 parts of the dyestuff from diazotized 1-amino-2-hydroxynaphthalene-4:6-disulfonic acid and 2:4-dihydroxybenzene-1-carboxylic acid of the formula

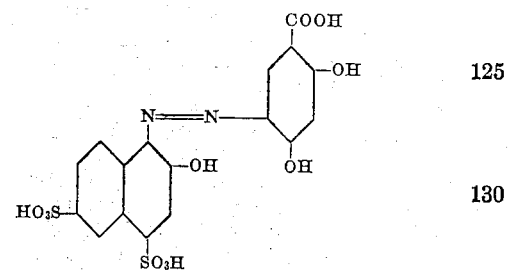

are dissolved in 500 parts of water and after addition of a solution of chromium fluoride, corresponding with 15.2 parts of $Cr_2O_3$, the whole is heated for 12 hours in a reflux apparatus. By then adding sodium carbonate any excess of chromium is precipitated, the precipitate is filtered and the filtrate evaporated. There is obtained a dyestuff in the form of a powder of bronze lustre which dissolves in water to a violet solution and in concentrated sulfuric acid to a red violet solution; it yields violet prints on cotton.

Example 8

54.8 parts of the dyestuffs from diazotized 1-amino-2-hydroxynaphthalene-4:6-disulfonic acid and 1-phenyl-3-methyl-5-pyrazolone of the formula

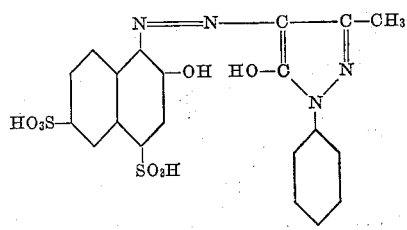

are dissolved in 1000 parts of water and, after addition of an aqueous solution of 25 parts of crystallized copper sulfate, the whole is heated to boiling for a short time. On addition of common salt, the copper compound is precipitated; when dry, the dyestuff is a brownish powder, soluble in water to a red solution and in concentrated sulfuric acid to an orange red solution. It dyes wool red tints.

Example 9

51.7 parts of the dyestuff, made by coupling diazotized 1-amino-2-hydroxynaphthalene-4:6-disulfonic acid with β-naphthol of the formula

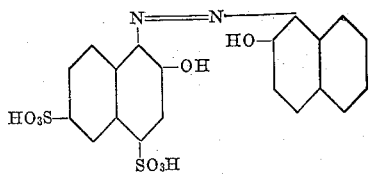

are dissolved in 100 parts of hot water and, after addition of an aqueous solution of 28 parts of crystallized nickel sulfate and 27 parts of crystalline sodium acetate, the whole is boiled for a short time. The dyestuff is then salted out. It is a dark powder, soluble in water to a red-violet solution and in concentrated sulfuric acid to a blue solution. It dyes wool red-violet tints.

Example 10

54.8 parts of the monosodium salt of the dyestuff from diazotized 1-amino-2-hydroxynaphthalene-4:6-disulfonic acid and 1-phenyl-3-methyl-5-pyrazolone of the formula

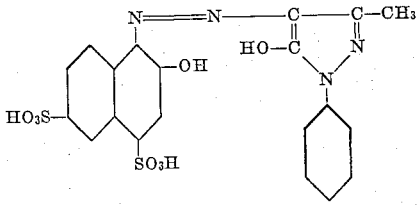

are dissolved in 600 parts of hot water and, after addition of 12 parts of ammonium vanadate, the whole is boiled for about an hour. After cooling, the liquid is acidified with some hydrochloric acid and the dyestuff is precipitated by addition of common salt. When dry, the dyestuff is a dark powder, soluble in water to a red solution and in concentrated sulfuric acid to an orange-red solution; it dyes wool in an acid bath red tints.

Example 11

34.1 parts of 1-amino-2-hydroxynaphthalene-4:6-disulfonic acid are diazotized in known manner and then mixed with an aqueous solution of 25 parts of crystallized copper sulphate; the whole is then added to a caustic alkaline solution of resorcinol. When coupling is complete the whole is boiled, then filtered if necessary, neutralized and the cupriferous dyestuff salted out from the azo-dyestuff of the formula

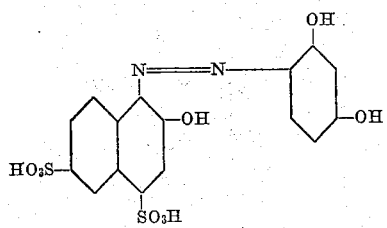

The latter is, when dry, a dark powder which dissolves in water and in concentrated sulfuric acid to red solutions. It dyes wool in an acid bath violet tints.

Example 12

0.2–0.4 part of the azo-dyestuff from diazotized 1-amino-2-hydroxynaphthalene-4:6-disulfonic acid and 1-hydroxynaphthalene-4:8-disulfonic acid of the formula

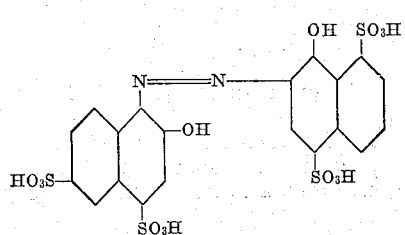

are dissolved, while boiling, in 100 parts of water. The dye-bath is prepared with 300 parts of water at 50–60° C., the dissolved dyestuff is added together with 0.1–0.2 part of dissolved copper sulfate and 10 parts of wool are entered. After addition of 1 part of crystallized Glauber's salt and 0.3 to 0.5 part of sulfuric acid of 66° Bé., the temperature is gradually raised to the boil and kept at the boiling temperature for ¾ hour to 1 hour. After rinsing and drying, there is obtained a very good violet, fast to light.

Example 13

A dye-bath is prepared with 3 per cent. of sulfuric acid of 66° Bé. and wool is handled therein at 60° C. for 10–15 minutes. The well dissolved dyestuff of Example 5 is then added and dyeing is continued for ½ hour at 60° C., the temperature is then gradually raised to the boil and a further 5 per cent. of sulfuric acid of 66° Bé. is added; the whole is boiled for ½ to ¾ hour to complete development of the tint. The wool is dyed pure rose tints very fast to light.

Example 14

For 100 parts of ordinary silk 2 parts of the dyestuff of Example 1 are dissolved in the necessary quantity of boiling water. This solution and 6–8 parts of acetic acid are added to the dye-bath; the goods are entered at 50–60° C., the bath warmed gradually to 80° C. and this temperature maintained for ¾ to 1 hour. There then follow washing, brightening in the usual manner and drying. The silk is dyed fast blue tints.

What we claim is:—
1. Process for the manufacture of metalliferous dyestuffs, consisting in reacting with agents yielding metals capable of forming lakes with the lake-forming groups of the dyestuffs, azo-dyestuffs of the general formula

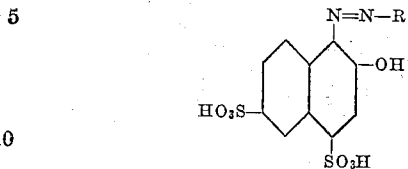

wherein R represents the radicle of a coupling component.

2. Process for the manufacture of metalliferous dyestuffs, consisting in reacting with agents yielding metals of the atomic weight 52 to 66, azo-dyestuffs of the general formula

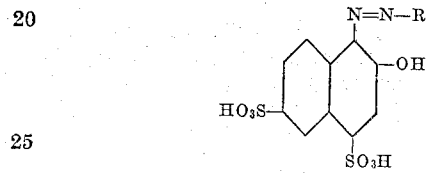

wherein R represents the radicle of a coupling component.

3. Process for the manufacture of chromiferous dyestuffs, consisting in reacting with agents yielding chromium, azo-dyestuffs of the general formula

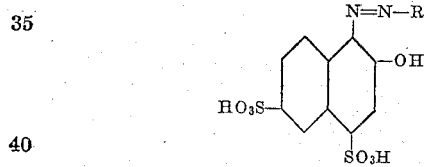

wherein R represents the radicle of a coupling component.

4. Process for the manufacture of chromiferous dyestuffs, consisting in reacting with agents yielding chromium, azo-dyestuffs of the general formula

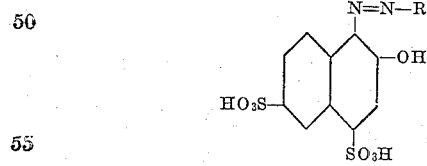

wherein R represents an aryl radicle capable of coupling.

5. Process for the manufacture of chromiferous dyestuffs, consisting in reacting with agents yielding chromium, azo-dyestuffs of the general formula

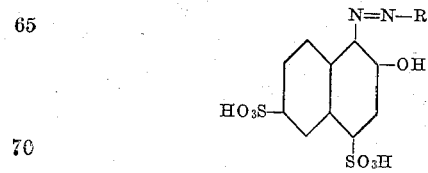

wherein R represents a naphthalene radicle capable of coupling.

6. Process for the manufacture of a chromiferous dyestuff, consisting in reacting with agents yielding chromium, the azo-dyestuff of the formula

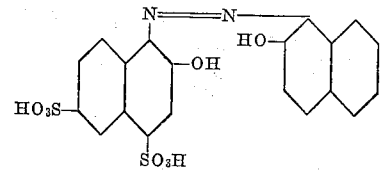

7. Process for the manufacture of chromiferous dyestuffs, consisting in reacting with agents yielding chromium, azo-dyestuffs of the general formula

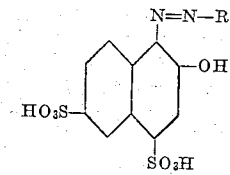

wherein R represents the radicle of such a coupling component of which the carbon atom linked with the —N=N— bridge belongs to a heterocyclic ring.

8. Process for the manufacture of chromiferous dyestuffs, consisting in reacting with agents yielding chromium, azo-dyestuffs of the general formula

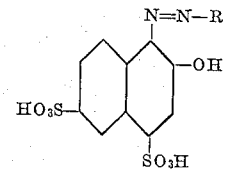

wherein R represents the radicle of such a coupling component of which the carbon atom linked with the —N=N— bridge belongs to a pyrazolone ring.

9. Process for the manufacture of a chromiferous dyestuff, consisting in reacting with agents yielding chromium, the azo-dyestuff of the formula

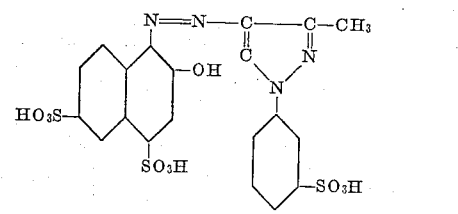

10. The metalliferous azo-dyestuffs, which azo-dyestuffs correspond with the general formula

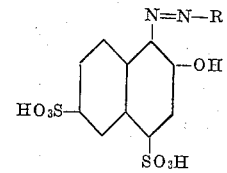

wherein R represents the radicle of a coupling component, which products form brown to red to dark colored powders, dissolving in concentrated sulfuric acid to yellow to orange to red to violet to blue solutions, and dyeing wool rose to red to violet to blue tints.

11. The metalliferous azo-dyestuffs, which contain metals of the atomic weight 52 to 66, which azo-dyestuffs correspond with the general formula

[structure: naphthalene with N=N—R, OH, HO₃S, SO₃H]

wherein R represents the radicle of a coupling component, which products form brown to red to dark colored powders, dissolving in concentrated sulfuric acid to yellow to orange to red to violet to blue solutions, and dyeing wool rose to red to violet to blue tints.

12. Chromiferous azo-dyestuffs, which azo-dyestuffs correspond with the general formula

[structure: naphthalene with N=N—R, OH, HO₃S, SO₃H]

wherein R represents the radicle of a coupling component, which products form brown to red to dark colored powders, dissolving in concentrated sulfuric acid to yellow to orange to red to violet to blue solutions, and dyeing wool rose to red to violet to blue tints.

13. Chromiferous azo-dyestuffs, which azo-dyestuffs correspond with the general formula

[structure: naphthalene with N=N—R, OH, HO₃S, SO₃H]

wherein R represents an aryl radicle capable of coupling, which products form brown to red to dark colored powders, dissolving in concentrated sulfuric acid to yellow to orange to red to violet to blue solutions, and dyeing wool rose to red to violet to blue tints.

14. Chromiferous azo-dyestuffs, which azo-dyestuffs correspond with the general formula

[structure: naphthalene with N=N—R, OH, HO₃S, SO₃H]

wherein R represents a naphthalene radicle capable of coupling, which products form brown to red to dark colored powders, dissolving in concentrated sulfuric acid to yellow to orange to red to violet to blue solutions, and dyeing wool rose to red to violet to blue tints.

15. A chromiferous azo-dyestuff, which azo-dyestuff corresponds with the formula

[structure: naphthalene-N=N-naphthalene with HO, OH, HO₃S, SO₃H]

which product forms a dark colored powder, dissolving in concentrated sulfuric acid to a blue-violet solution and dyeing wool blue tints.

16. Chromiferous azo-dyestuffs, which azo-dyestuffs correspond with the general formula

[structure: naphthalene with N=N—R, OH, HO₃S, SO₃H]

wherein R represents the radicle of such a coupling component of which the carbon atom linked with the —N=N— bridge belongs to a heterocyclic ring, which products form brown to red to dark colored powders, dissolving in concentrated sulfuric acid to yellow to orange to red solutions, and dyeing wool rose to red tints.

17. Chromiferous azo-dyestuffs, which azo-dyestuffs correspond with the general formula

[structure: naphthalene with N=N—R, OH, HO₃S, SO₃H]

wherein R represents the radicle of such a coupling component of which the carbon atom linked with the —N=N— bridge belongs to a pyrazolone ring, which products form brown to red to dark colored powders, dissolving in concentrated sulfuric acid to yellow to orange to red solutions, and dyeing wool rose to red tints.

18. A chromiferous azo-dyestuff, which azo-dyestuff corresponds with the formula

[structure: naphthalene-N=N-pyrazolone with C—CH₃, HO—C, N, OH, HO₃S, SO₃H, phenyl-SO₃H]

which product forms a dark red powder, dissolving in concentrated sulfuric acid to a yellow solution, and dyeing wool rose tints.

FRITZ STRAUB.
WALTER HANHART.